JOHN H. ANINGER
INVENTOR.

United States Patent Office 3,313,377
Patented Apr. 11, 1967

3,313,377
MATERIAL HANDLING AND TRANSPORTATION EQUIPMENT
John H. Aninger, 2031 S. Beverly Glen Blvd., Los Angeles, Calif. 90025
Filed Nov. 22, 1965, Ser. No. 509,121
1 Claim. (Cl. 188—5)

The subject of this invention is an improved material handling equipment for holding material for storage and transportation, selectively, in and about a warehouse and a manufacturing plant, known by the colloquial term "dolly." The dollies are capable of moving freely under their own weight, requiring external securing means when parked and especially when becoming loaded. The material handling and transportation equipment in accordance with this invention constitutes a device that has the loading capabilities of the conventional dolly, combined with secure positioning qualities. This characteristic allows for the placing of, for example, a conventional pallet upon the dolly, to transport said pallet by means of the dolly without the need of a fork lift.

Another object of this invention is to provide a means for the securing of the dolly integral with the equipment structure.

Yet another object of this invention is a noncomplex arrangement for the actuation and for the release of this securing means respectively.

A further objective of this invention is to prepare a straight-forward operation for the aforementioned actuation and release machanism requiring no special skill of the personnel.

Another objective is to provide a material handling and transportation equipment capable of economizing on flow of work, flow of merchandise and the man-hours expended therefor.

Additional objectives, advantages and improvements over prior art will become apparent from the following description and the accompanying drawing, illustrating but one representative embodiment of the material handling and transportation equipment in accordance with this invention.

Figure 1:
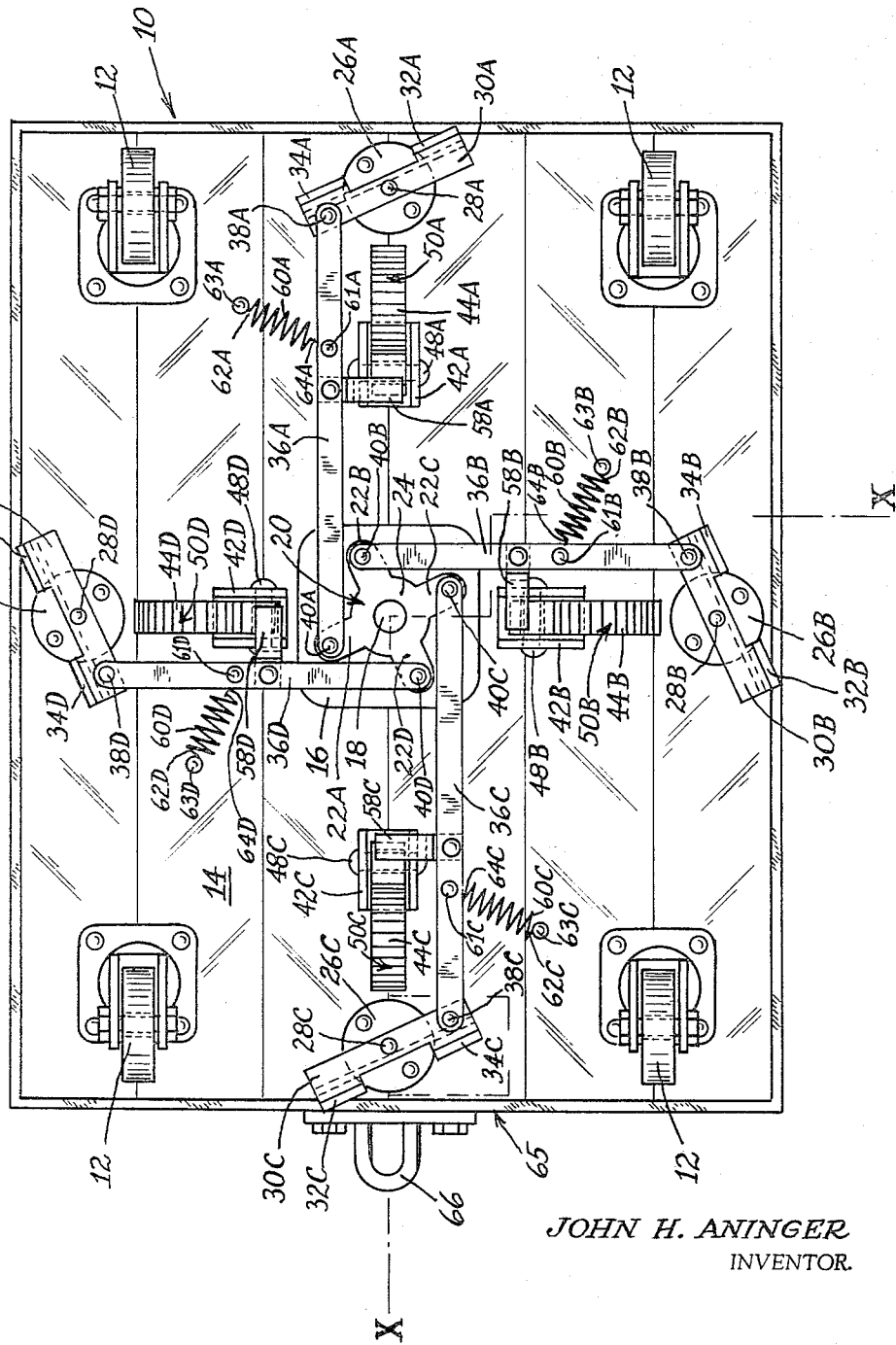
Figure 2:
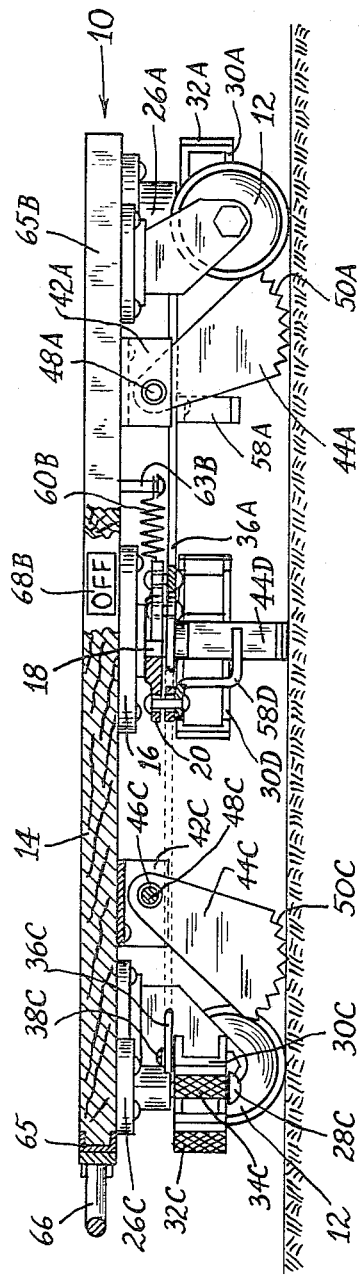

In the drawing, FIG. 1 illustrates the dolly together with its position securing mechanism in bottom view and FIG. 2 shows the dolly and the position securing provisions partly in front elevation and partly in an independent cross section, performed in the vertical plane arrangement x—x, standing upon a supporting floor surface.

Referring now to the drawing, wherein like reference characters designate like or corresponding parts, and particularly to FIG. 1, illustrating a typical dolly 10 in bottom view, a swivel-type caster 12 is mounted near each corner of the dolly platform 14 imparting the mobility to said dolly in each possible direction on a supporting surface.

A bracket 16 is mounted in the geometric center on the underside of the platform 14, carrying a pivot stem 18. This pivot stem 18 is extending downwardly from and perpendicularly to said platform underside surface.

A starwheel 20 having four arms 22A, 22B, 22C, and 22D extending radially from its hub 24, is mounted rotatably on a pivot stem 18. Also on the underside of the platform 14, at the midpoint of each of the four sides, a bracket 26A, 26B, 26C, 26D, having a pivot stem 28A, 28B, 28C, and 28D, respectively, is mounted, each said pivot stem extending downwardly and perpendicularly from said platform underside. A lever 30A, 30B, 30C, and 30D is mounted rotatably on each said pivot stem 28A, 28B, 28C, 28D, respectively. Each said lever 30A, 30B, 30C, 30D is equipped with one pedal 32A, 32B, 32C, 32D, on its left hand side, and with another pedal 34A, 34B, 34C, 34D, on its right hand side, both side references when viewed as shown on FIG. 1. Each said lever 30A, 30B, 30C, 30D is connected with its respective arm 22A, 22B, 22C, 22D of the starwheel 20 by means of a connecting bar 36A, 36B, 36C, 36D. One end of said connecting bar 36A, 36B, 36C, 36D is pivoted by means of an axle 38A, 38B, 38C, 38D to its respective lever 30A, 30B, 30C, 30D, whereas its other end is pivoted by means of another axle 40A, 40B, 40C, 40D, to its respective starwheel arm 22A, 22B, 22C, 22D. A bearing bracket 42A, 42B, 42C, 42D, having for example the shape of an inverted U, is mounted, likewise, on the underside of the platform 14 near the midpoint of each platform side, however, located radially nearer the geometric platform center. A brake shoe 44A, 44B, 44C, 44D, having a hole 46A, 46B, 46C, 46D formed in its respective upper portion, as clearly visible in FIG. 2, is mounted rotatably in its respective bearing bracket 42A, 42B, 42C, 42D by means of the corresponding axle 48A, 48B, 48C, 48D, and with adequate play between each such brake shoe hole 46A, 46B, 46C, 46D and its correlated axle 48A, 48B, 48C, 48D so as to allow the forward portion of each said brake shoe 44A, 44B, 44C, 44D, to rotate freely in a downward direction and to make contact with the floor, by means of gravity. The face 50A, 50B, 50C, 50D of each respective brake shoe 44A, 44B, 44C, 44D has an intentionally coarse surface finish so as to increase the friction between such face and such floor. The degree of coarseness of each said brake shoe face 50A, 50B, 50C, 50D can be increased through serrations, as shown in the drawing, diamond-knurled surface pattern, and abrasive and adhesive material layers, selectively. To assure the brake shoe engagement with the floor, in addition to the action of gravity, a mechanical compression spring, not shown in the drawing, may be mounted with one of its ends on the underside of the platform 14, and with its other end on the respective brake shoe 44A, 44B, 44C, 44D, so as to bias each said brake shoe against the floor. A brake shoe release bar 58A, 58B, 58C, 58D is mounted on each respective connecting bar 36A, 36B, 36C, 36D, extending therefrom horizontally to and beyond the underside of each respective brake shoe 44A, 44B, 44C, 44D. A mechanical compression spring 60A, 60B, 60C, 60D is mounted at one of its ends 62A, 62B, 62C, 62D to a bolt 63A, 63B, 63C, and 63D, respectively, on the underside of the platform 14 and with its other end 64A, 64B, 64C, 64D on the corresponding connecting bar 36A, 36B, 36C, 36D, through a stem 61A, 61B, 61C, and 61D in such an over-center manner so as to expand at each extreme position of the pedal 32A, 32B, 32C, 32D and 34A, 34B, 34C, 34D, respectively, precluding a negligent and incomplete pedal operation, imparting a "feel" on the personnel using the dolly in its presented form and locking the control mechanism. Depending on the service requirements, at least one lug 66 can be mounted on an edge 65 of the dolly platform to accommodate truck hooks and equivalent means.

FIG. 2 shows specific parts of the dolly in both its true working position and natural relationship with respect to the supporting floor surface and the effects of gravity on, particularly, the brake shoe 44A, 44B, 44C, 44D and its self-locking characteristics.

The operation of the dolly equipped with the improvement in accordance with this invention follows from the foregoing in an almost self-explanatory fashion. When one of the pedals 34A, 34B, 34C, 34D is pushed toward the geometric platform center to assume a position, together with the entire mechanism, as shown, especially, in FIG. 1, each release bar 58A, 58B, 58C, 58D clears each corresponding brake shoe 44A, 44B, 44C, 44D, so as to allow contact between each latter part and the supporting floor. Thusly, the dolly cannot be moved, nor can it accelerate under its own weight when idle. It is obvious, that when the dolly is located on an inclined surface, only that brake shoe quantity will become active which is capable and required of exerting forces opposing the gravitational forces acting on the dolly. To prepare for the dolly travel, one of the pedals 32A, 32B, 32C, 32D is pushed from its shown forward position toward the center of the platform 14, whereby each release bar 58A, 58B, 58C, 58D is engaging the respective brake shoe 44A, 44B, 44C, 44D, disengaging it from the supporting floor and allowing for the movement of the dolly. It further becomes apparent that an actuation of the braking mechanism 32, 30, 36, 22, 58, 44 at, say, station "A" permits for the opposite actuation at any of the other stations "B," "C," and "D," selectively, by virtue of the parts arrangement in accordance with this invention. This feature provides a tremendous advantage for the operating personnel, especially when a formerly accessible dolly area becomes obstructed upon loading and disassociated events in its proximity. Both the pedal location in the front of each platform side, and the construction which offers only that pedal for actuation that will require it next, facilitate the handling. If, however, the display of directions should become desired, the instructions 68B may be mounted on the platform edges as shown in FIG. 2 for edge 65B.

The entire construction of the braking and release mechanism excels in utmost simplicity. Numerous parts at one location are identical with the respective parts at other locations as to shape, size, installation and application. Only a very small quantity of parts requires individual properties for each item. The generous tolerances of both the construction and operation allow for expeditious, economical assembly and for but little maintenance during the equipment life.

It should be noted that the braking and release mechanism, shown and described herein for a substantially rectangularly shaped platform, can be readily adapted so as to accommodate dollies of various other geometric configurations, such as square, round, oval, elliptic, triangular and kidney-shaped platforms to serve specific purposes. It is also apparent that the mechanism shown in the drawing for four brake shoes and the correlated four mechanical transmissions, can then be elected to three such entities. This will not only reduce both the quantity and variety of the required component parts, but it will make the operations, especially that of the brake shoe actions, more adequate with regard to the physical laws of force analysis and resolution.

It is further understood that the dolly variety together with one representative position securing equipment shown and described in this specification and the accompanying drawing, constitute but one possible embodiment of the subject invention, and that numerous variations, modifications and rearrangements are feasible without departing from the spirit of this invention.

What is claimed is:

A material handling and transportation equipment comprising:

a platform having at least three casters mounted on its underside adapted to support said platform, at least three brake shoes, each said brake shoe having an operating surface with inherent high-friction qualities mounted rotatably about a horizontal axle on the underside of said platform and spaced from each other horizontally by effectually equal circular angles and adapted to make contact between said brake shoe surface and the floor surface when in uncontrolled position of each said brake shoe, a bracket having a perpendicularly and downwardly extending pivot stem mounted in the geometric center and on the underside of said platform, a starwheel having a plurality of arms and a hole formed in the extremity of each said arm mounted rotatably on said pivot stem, a plurality of brackets, each said bracket having a perpendicularly and downwardly facing pivot stem mounted near the perimeter of said platform and spaced apart from each other horizontally by effectually equal circular angles, a plurality of levers, each said lever having a pedal on each of its two extreme front faces and a hole formed in one extremity mounted rotatably on each said pivot stem adapted to be accessible and operable from said platform perimeter, a plurality of connecting bars, each said connecting bar having a hole formed in each of its two ends, each said connecting bar mounted rotatable at one end on said pedal extremity by means of a first axle, and mounted rotatably at its other end by means of a second axle on the co-acting arm of said starwheel, a plurality of bolts, each said bolt mounted on the underside of said platform adjacent to one of said connecting bars, a plurality of stems, each said stem mounted on one of said connecting bars in a before and past dead-center position, respectively, with regard to each said corresponding bolt, a plurality of mechanical compression springs, each said mechanical compression spring having one closed coil turn at each end, each said mechanical compression spring mounted with one said closed coil turn on one said bolt and with the other closed coil turn on one said corresponding connecting-bar stem, each said mechanical compression spring biased between said connecting bar stem and each said corresponding bolt.

References Cited by the Examiner

UNITED STATES PATENTS

| | | | |
|---|---|---|---|
| 1,029,301 | 6/1912 | Kertesz | 188—5 |
| 2,209,581 | 7/1940 | Remsen. | |
| 2,942,693 | 6/1960 | Johnson | 188—5 |

FOREIGN PATENTS 346,902   12/1904   France.

MILTON BUCHLER, *Primary Examiner.*

BENJAMIN HERSH, *Examiner.*

B. S. MOWRY, T. W. BUCKMAN, *Assistant Examiners.*